(12) United States Patent
Avalani et al.

(10) Patent No.: US 9,058,210 B2
(45) Date of Patent: Jun. 16, 2015

(54) WEIGHTED REQUEST RATE LIMITING FOR RESOURCES

(75) Inventors: Bhaven Avalani, Cupertino, CA (US); Abhinav Kumar, San Jose, CA (US); Ronald Francis Murphy, Pleasanton, CA (US); Ping Zhao, Saratoga, CA (US)

(73) Assignee: eBay Inc., San Jose, CA (US)

(*) Notice: Subject to any disclaimer, the term of this patent is extended or adjusted under 35 U.S.C. 154(b) by 412 days.

(21) Appl. No.: 12/948,599

(22) Filed: Nov. 17, 2010

(65) Prior Publication Data

US 2011/0238838 A1  Sep. 29, 2011

Related U.S. Application Data

(60) Provisional application No. 61/316,763, filed on Mar. 23, 2010.

(51) Int. Cl.
*G06F 15/173* (2006.01)
*G06F 9/50* (2006.01)
(Continued)

(52) U.S. Cl.
CPC ........ *G06F 9/5011* (2013.01); *G06F 17/30864* (2013.01); *G06F 17/30657* (2013.01);
(Continued)

(58) Field of Classification Search
CPC ............ H04L 62/14–62/1433; H04L 62/1458; H04L 2463/141–2463/145; H04L 12/5695; H04L 67/22; H04L 67/30–67/306; H04L 41/50–41/5096; H04L 63/10–63/108; G06F 9/50–9/5055; G06F 11/3438; G06F 11/3447–11/3466; G06F 17/30657–17/30693; G06F 17/30864–17/3087; G06F 2009/504
USPC ................. 709/201–203, 217–219, 223–235; 726/22–25
See application file for complete search history.

(56) References Cited

U.S. PATENT DOCUMENTS 6,400,687 B1 * 6/2002 Davison et al. ............... 370/236
6,885,641 B1 * 4/2005 Chan et al. .................... 370/252
(Continued)

FOREIGN PATENT DOCUMENTS

EP          1560398  A2   8/2005
WO   WO-0201834  A2   1/2002
WO   WO-0201834  A3   1/2002

OTHER PUBLICATIONS

Eriksen, Marius, "Trickle: A Userland Bandwidth Shaper for Unix-like Systems", USENIX 2005 Annual Technical Conference, (2005), 61-70.
(Continued)

*Primary Examiner* — Patrice Winder
*Assistant Examiner* — Julian Chang
(74) *Attorney, Agent, or Firm* — Schwegman Lundberg & Woessner, P.A.

(57) ABSTRACT

Methods and systems to automatically respond to consider the weight of a request when responding to requests associated with resources are described. In one embodiment, an interface module may be configured to receive a request associated with consumer identifier and a resource. A calculator module may be configured to determine a weight of the request and a usage module configured to calculate, using a processor, a usage level associated with the consumer identifier, the usage level based on a usage history associated with the consumer identifier. An enforcer module may also be configured to respond to the request based on the usage level and the weight of the request. In one embodiment, the usage module may also be configured to update the usage level associated with the consumer identifier based on the weight of the request.

20 Claims, 4 Drawing Sheets

(51) Int. Cl.
  *H04L 12/54* (2013.01)
  *G06F 17/30* (2006.01)
  *H04L 29/08* (2006.01)
  *H04L 29/06* (2006.01)

(52) U.S. Cl.
  CPC .............. *G06F9/505* (2013.01); *H04L 67/22* (2013.01); *H04L 12/5695* (2013.01); *H04L 63/10* (2013.01); *Y02B 60/142* (2013.01); *G06F 2209/504* (2013.01)

(56) References Cited

U.S. PATENT DOCUMENTS

| | | | | |
|---|---|---|---|---|
| 7,065,482 | B2* | 6/2006 | Shorey et al. | 709/224 |
| 7,305,431 | B2* | 12/2007 | Karnik et al. | 709/203 |
| 7,313,092 | B2 | 12/2007 | Lau et al. | |
| 7,730,531 | B2* | 6/2010 | Walsh | 726/22 |
| 8,249,904 | B1* | 8/2012 | DeSantis et al. | 705/7.12 |
| 2002/0184363 | A1* | 12/2002 | Viavant et al. | 709/224 |
| 2003/0208523 | A1* | 11/2003 | Gopalan et al. | 709/201 |
| 2004/0064531 | A1* | 4/2004 | Wisner | 709/221 |
| 2004/0064557 | A1* | 4/2004 | Karnik et al. | 709/225 |
| 2005/0010571 | A1* | 1/2005 | Solotorevsky et al. | 707/5 |
| 2005/0018611 | A1* | 1/2005 | Chan et al. | 370/241 |
| 2005/0177629 | A1* | 8/2005 | Betge-Brezetz et al. | 709/223 |
| 2006/0036743 | A1* | 2/2006 | Deng et al. | 709/227 |
| 2006/0150158 | A1* | 7/2006 | Fellenstein et al. | 717/126 |
| 2006/0152756 | A1* | 7/2006 | Fellenstein et al. | 358/1.15 |
| 2006/0155633 | A1* | 7/2006 | Fellenstein et al. | 705/37 |
| 2006/0168584 | A1* | 7/2006 | Dawson et al. | 718/104 |
| 2006/0235827 | A1* | 10/2006 | Walsh | 707/2 |
| 2007/0078960 | A1* | 4/2007 | Dawson et al. | 709/223 |
| 2007/0094381 | A1* | 4/2007 | Weiss et al. | 709/224 |
| 2008/0005274 | A1* | 1/2008 | Subbanna et al. | 709/218 |
| 2008/0162664 | A1 | 7/2008 | Jegadeesan | |
| 2008/0162679 | A1* | 7/2008 | Maher et al. | 709/223 |
| 2009/0144032 | A1* | 6/2009 | Arora et al. | 703/2 |
| 2009/0265421 | A1 | 10/2009 | Rabinovich | |
| 2009/0280907 | A1 | 11/2009 | Larsen et al. | |
| 2010/0217821 | A1* | 8/2010 | Grayson et al. | 709/206 |
| 2010/0218251 | A1* | 8/2010 | Walsh | 726/22 |
| 2010/0271956 | A1* | 10/2010 | Diwakar et al. | 370/242 |
| 2011/0004929 | A1* | 1/2011 | Hopkins et al. | 726/9 |
| 2011/0117537 | A1* | 5/2011 | Funada | 434/365 |
| 2011/0173637 | A1* | 7/2011 | Brandwine et al. | 719/314 |
| 2011/0320607 | A1* | 12/2011 | Harrang et al. | 709/226 |
| 2012/0066671 | A1* | 3/2012 | Adhikary et al. | 717/170 |

OTHER PUBLICATIONS

Mogul, Jeffrey C, et al., "API Design Challenges for Open Router Platforms on Proprietary Hardwarev", [Online]. Retrieved from the Internet: <URL: http://www.hpl.hp.com/techreports/2008/HPL-2008-108.html>, (Sep. 21, 2008), 6 pgs.

Zeng, Yuanyuan, et al., "Containment of Network Worms via Per-Processimag Rate-Limiting", SecureComm, (2008), 10 pgs.

* cited by examiner

WEIGHTED REQUEST RATE LIMITING FOR RESOURCES

CROSS-REFERENCE TO A RELATED APPLICATION

This application claims the benefit of U.S. Provisional Patent Application entitled "Weighted Request Rate Limiting for Electronic Resources," App. No. 61/316,763, filed Mar. 23, 2010, the content of which is herein incorporated by reference in its entirety.

TECHNICAL FIELD

The present application relates generally to the technical field of electronic communications and, in one specific example, to weighted request rate limiting for electronic resources.

BACKGROUND

In an online system providing access to resources, the rate of requests for those resources may be limited to prevent overuse or abuse by requesters. Traditional rate limiting may involve restricting the number of requests an individual requester, or a group of requesters, may make in a given time period.

BRIEF DESCRIPTION OF THE DRAWINGS

Some embodiments are illustrated by way of example and not limitation in the figures of the accompanying drawings in which.

DETAILED DESCRIPTION

Figure 1:
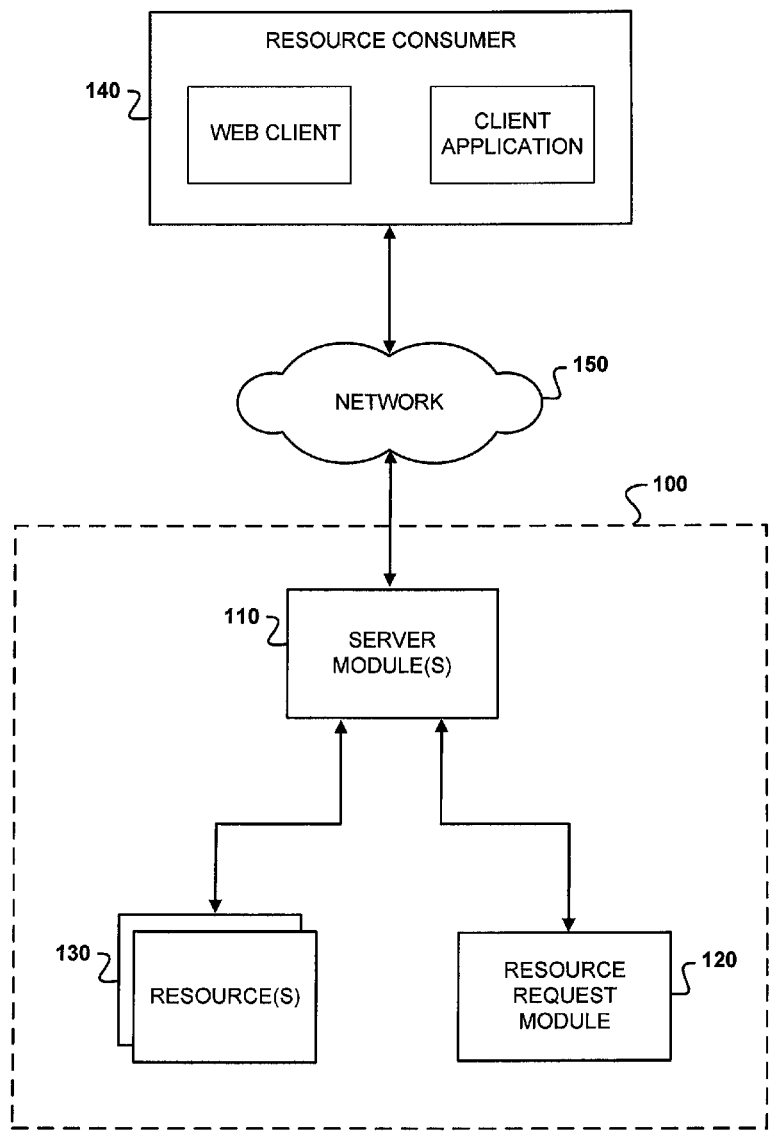
FIG. 1 is a block diagram of that illustrates a network environment within which a resource provider infrastructure 100 for electronic resources may be implemented in accordance with an example embodiment.

Example methods and systems for weighted request rate limiting for electronic resources are described. In the following description, for purposes of explanation, numerous specific details are set forth in order to provide a thorough understanding of example embodiments. It will be evident, however, to one skilled in the art that embodiments of the present invention may be practiced without these specific details.

Resource providers may provide a number of resources to resource consumers. To gain access to one or more of the resources, a resource consumer may send a request associated with one or more resources to the resource provider and the resource provider may be configured to respond to the request by providing the requested resource or enabling the requested resource to be provided to the consumer in servicing the request. For example, resource providers may provide access to facilities, services, documents, information, manufactured goods, raw materials, or electronic resources that may include electronic documents, web pages, bandwidth, electronic services (e.g., search services, database access, access to servers and server capabilities, application functionality, processing, etc.), among other things.

Providing consumers with access to resources may impact a resource provider's infrastructure. Each resource provided to a consumer may have an associated weight or cost on the provider's infrastructure. When multiple resources are requested and provided to multiple consumers, the weights or costs associated with the requests add up. For example, in the context of a network-based application platform such as a publishing platform or a marketplace platform, a resource consumer may submit a query request that requires a number of resources, such as some processing by a database server. The processing by the database server needed by the query may have certain associated costs that may be measured, for example, by the amount of time (e.g., processing time), memory, bandwidth, storage, or other computing resources. When a number of query requests and other requests require processing from the database server (e.g., record creation requests, record modification requests, record deletion requests, database management requests, etc.), the costs for a database server may approach or even exceed the database server's limits on its capabilities. Furthermore, responding to certain requests may impose different burdens on varying resources, and differing degrees of burden on the infrastructure than responding to other requests (e.g., querying a database may require substantially more processing than a webpage request). Overuse or abuse by a resource consumer may ultimately degrade the infrastructure's ability to serve other resource consumers.

To protect against overuse or abuse by resource consumers, the resource provider may impose limits on the rate at which a resource consumer may request a resource. In certain cases, a resource provider may limit the number of requests from a resource consumer. However, in such cases, the situation may arise where the resources provided by the resource provider's infrastructure are dominated by resource requests associated with a high cost or weight (e.g., expensive resource requests) to the detriment of resource requests associated with a low or negligible cost or weight. For example, a resource's capabilities may be taken up by servicing expensive resource requests (e.g., those that produce a greater infrastructure impact) to the extent that the limits of the resource's capabilities are reached and a number of resource requests, both cheap (e.g., requiring less infrastructure impact) and expensive, are not able to be fulfilled.

In one embodiment, a resource provider may protect its infrastructure without unduly restricting access to its resources by performing a rate limiting function in a burden sensitive way (e.g., accounting for the infrastructure impact and burden imposed by serving a each specific resources request when limiting the rate or resource requests). By taking into consideration the weight or cost of a request on the infrastructure's resources in managing requests and not merely the number of requests, the resource provider may, in some embodiments, provide better infrastructure protection or enable more efficient and fair use of its infrastructure.

FIG. 1 is a block diagram that illustrates a network environment within which a resource provider infrastructure 100 for electronic resources may be implemented in accordance with an example embodiment. Although the embodiment of FIG. 1 illustrates a resource provider infrastructure 100 for electronic resources, other types of resources are also contemplated. Infrastructure 100 may include one or more server modules 110, a resource request module 120, and one or more electronic resources 130. In one embodiment, the components of infrastructure 100 may be located on a single machine or at a single location. In other embodiments, however, the components may be distributed over one or more machines or networks. The server modules 110 may be communicatively coupled to the resource request module 120 and the electronic resources 130. The resource request module 120 may also be logically coupled to the electronic resources 130 (not shown) to be aware of the burden imposed on the resources 130 in serving a request, also known as the request's cost or weight. Although FIG. 1 illustrates the resource request module 120 as being distinct from the server module 110, in other embodiments, the resource request module 120 may be a component in the server module 110.

The infrastructure 100 may be connected to one or more resource consumers 140 via a network 150, such as, for example, the Internet or a wide area network (WAN). The resource consumer 140 may be a person, a machine, an application, a function, or any other entity that may make a request of the infrastructure 100. The resource consumer 140 may connect to an interface of a server module 110 through the network 150 to make a request that is associated with one or more electronic resource 130. For example, a web client of the resource consumer 140 may interact with a web interface for a server module 110 or a client application of the resource consumer 140 may interact with an application programming interface (API) of the server module 110. While the network environment shown in FIG. 1 employs a client-server architecture, embodiments disclosed herein are not limited to such an architecture and could equally well find application in a distributed, or peer-to-peer, architecture system, for example. In still another possible embodiment, the resource consumer can be collocated with the server module through software layering in a computer process. In other words, the consumer may not necessarily need to communicate with the server module via a network.

A server module 110 receiving a request from a resource consumer may inform the resource request module 120 of the request and may seek instructions or a recommendation from the resource request module 120 on actions to take on the request. In one embodiment, in addition to any necessary request formatting, the server module 110 may also determine a consumer identifier and include the consumer identifier with the request it sends to the resource request module 120. The consumer identifier may be received by the server module 110 as a parameter of the request or some other communication from the resource consumer, or it may be inferred from other information available to the server module 110. For example, an inferred consumer identifier may be an internet protocol (IP) address that is determined by the server module 110. On the other hand, an application ID or user ID may be supplied to the server module 110 directly by the consumer. Other examples of consumer identifiers (e.g., subject identifier) may include a process ID, a group ID representing a group of consumer identifiers, or a media access control (MAC) address, among other things.

The request module 120 responds to the request and may provide the server module 110 with instructions or recommendations on how to handle the request. Once the server module 110 receives instructions or a recommendation from the resource request module 120, the server module 110 may implement those instructions or analyze the recommendations before taking further actions. Example actions may include, but are not limited to, allowing the request, denying the request, flagging the request, assigning a lower priority to the request, holding the request in a queue, providing an alternative quality of service for the request, sending a notification, or applying some other condition to the request.

Figure 2:
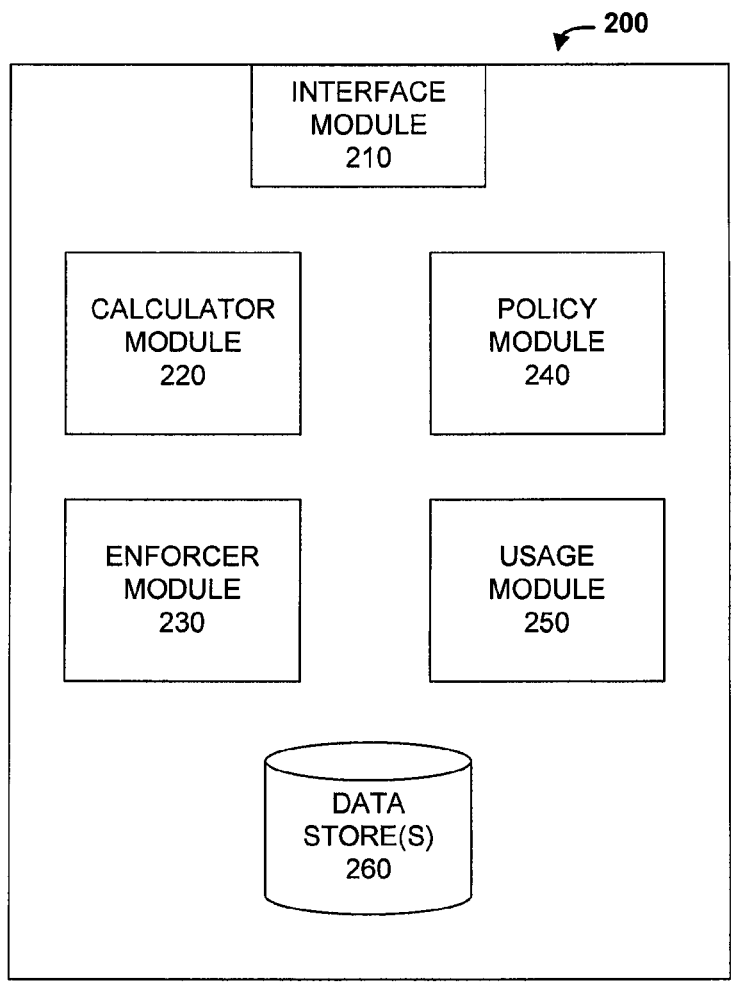
FIG. 2 is a block diagram that illustrates a resource request module 200 in accordance with one example embodiment.

FIG. 2 is a block diagram that illustrates a resource request module 200 in accordance with one example embodiment. The resource request module 200 may comprise an interface module 210, a calculator module 220, an enforcer module 230, a policy module 240, a usage module 250, and one or more data stores 260 (e.g., databases, memories, etc.) that may be used by the modules. The various modules described may be implemented in hardware, software, firmware, or a combination of the above.

The policy module 240 may be configured to store and maintain user policies for the resources. The user policies may comprise one or more rules that govern the ability of resource consumers to access resources. A user policy may restrict access to resources based on a particular consumer identifier associated with the request, the type of consumer identifier associated with the request, or a particular group that includes the consumer identifier associated with the request.

The interface module 210 may be configured to communicate with a server module 110 and possibly resource consumers 140. For example, the interface module may 210 receive a request from a server module 110 or from a resource consumer 140. The calculator module 220 may be configured to determine the weight of various requests on one or more resources 130. The usage module 250 may be configured to manage, maintain, and update usage histories of the consumer based on requests made by the consumer and also calculate a usage level for the consumer. After the one or more usage levels are calculated, the enforcer module 230 may decide how to respond to the request based on the usage levels and usage policy and respond accordingly. Further details may be better understood in the context of the embodiment illustrated by FIG. 3.

Figure 3:
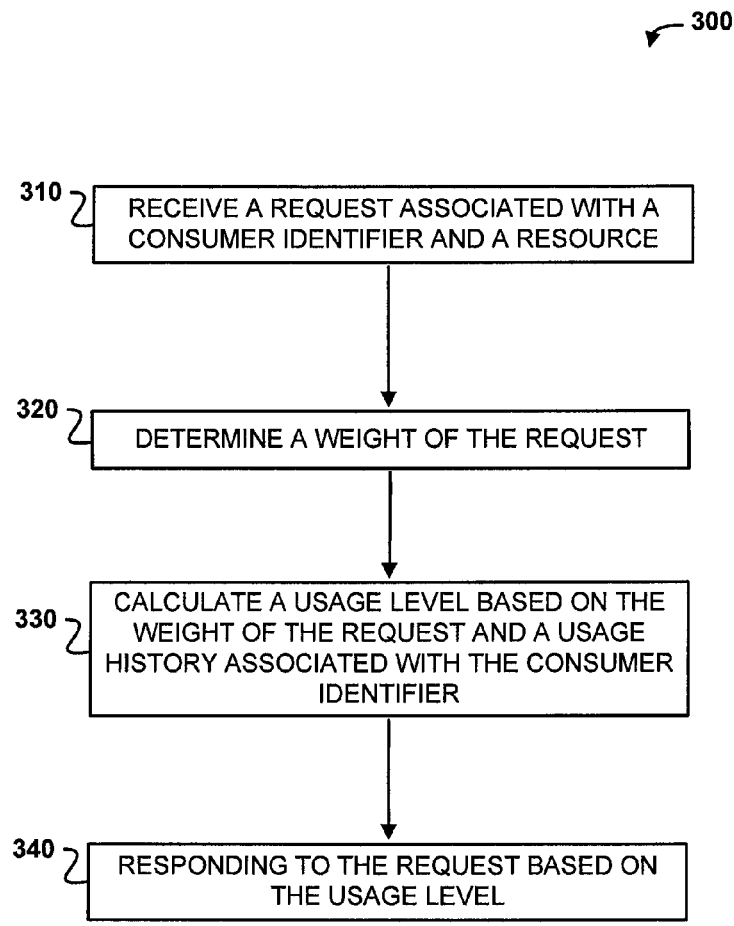
FIG. 3 is a flow diagram illustrating a method to respond to a request based on a weight of the request in accordance with one example embodiment.

FIG. 3 is a flow diagram illustrating a method 300 to respond to a request based on a weight of the request according to an example embodiment. At operation 310, the interface module 210 receives a request which may include a consumer identifier that indicates the consumer making the request and at least one resource identifier that identifies the one or more resources that may be used in servicing the request. After the request is received, at operation 320, the calculator module 220 determines the weight of the request. For example, the calculator module 220 may identify which resources are required to service the request, determine how much of each resource is required, determine how much time is required to service the request, etc. Based on these and possibly other factors, the calculator module 220 may generate a weight using a predetermined metric or formula.

In another embodiment, the weight of the request may be determined by identifying the type or category of the request and, in some instances, parameters associated with the request. The type and/or parameters may be used to calculate a predicted or estimated weight of the request or look up a predetermined weight value in a database. These predicted or estimated weights may be based on servicing or responses to previous requests of a similar type or with similar parameters. For example, a request may be of the "query request" type and the parameters for the request may be based on the category or database to be searched or the search terms associated with the request (e.g., the number of search terms, the particular search terms, the expected number of search results, etc.). In this scenario, the calculator module 220 may determine a weight associated with the request based on the "query request" type and the particular parameters associated with the request.

After the weight of the received request is determined, the usage module 250 may calculate the usage level of the consumer based on the usage history of the consumer at operation 330 and, in some embodiments, the weight of the request as well. The usage level is a measure (e.g., a counter) of how much a consumer is utilizing certain resources in a resource provider infrastructure and may be expressed in terms of a usage policy that is stored in the policy module 240. For example, if the applicable usage policy contains a rule where requests associated with some resource will be restricted in some way if that particular resource consumer has an aggregated weight of over a certain amount over a specific time period, the usage level associated with a particular consumer identifier may be calculated as the aggregated weight of the requests associated with the consumer identifier over the specified time period.

In another embodiment, a usage policy may be based on a change in a pattern in the usage history associated with the consumer identifier. For example, the usage policy may contain a rule that restricts requests from a consumer if the consumer's average response time for a request grows a certain amount over a specified time period. In this case, the usage level may be expressed by the consumer's change in average response time for a request over the specified time period. Other example usage policies may impose a simple aggregated weight limit where the aggregated weights of requests associated with a particular consumer identifier may not exceed the weight limit or a weight limit per requests where a request that will have a weight over the weight limit will be restricted.

Thus, the usage level may be thought of, in some embodiments, as a measure of the burden imposed by a particular consumer's requests in the context of the applicable usage policy. In some cases a usage policy may contain several policy rules and, as a result, several usage levels may need to be calculated. Once the usage level of the consumer is determined, the enforcer module 230 may determine an appropriate response to the request based on the usage policy and respond to the request at operation 340 (e.g., produce a recommended action for the request based on the usage level). For example, if the usage level is above a certain value, the enforcer module 230 may, in accordance with the usage policy, reject the consumer's request or recommend that the server module 110 reject the consumer's request.

As discussed above, the usage history of a consumer may be used to calculate the usage level associated with a consumer. In one embodiment, the usage module 250 may also be configured to monitor the usage histories. For example, the request information associated with each request received may be recorded in a database. As each request from a consumer is received, the usage module 250 may update the usage history for the consumer based on the request information. The request information may include the predicted weight of the request, the actual weight of the request, the size of the response, the time received, the time needed to respond to the request (e.g., response time), the request type, request parameters, the consumer identifier associated with the request, etc. By updating the usage history after receiving a request, the usage module 250 will be able to provide an updated calculation of the usage level associated with a consumer for subsequent requests by the consumer.

In one embodiment, a resource request module 200 may comprise more than one set of calculator modules 220, enforcer modules 230 and usage modules 250 in order to provide additional scalability capabilities. Each set of modules may be configured to handle received requests in parallel. In one embodiment, the different sets of modules may handle different categories of requests and the interface module 210 that receives the request may be configured to determine the category of the request and transmit the request to the appropriate set of modules. For example, one set of modules may handle "query" type requests while another set of modules may be configured to handle "web page" type requests. In another embodiment, the responsibilities of each set of modules may be organized based on which set of resources are being used and to what extent.

Sets of modules may also be organized based on a category or grouping of consumer identifiers. For example, in one embodiment, requests that are associated with consumer identifiers that are IP addresses may be handled by one set of modules, requests that are associated with consumer identifiers that are application IDs may be handled by another set of modules, and requests that are associated with consumer identifiers that are user IDs may be handled by still another set of modules.

Figure 4:
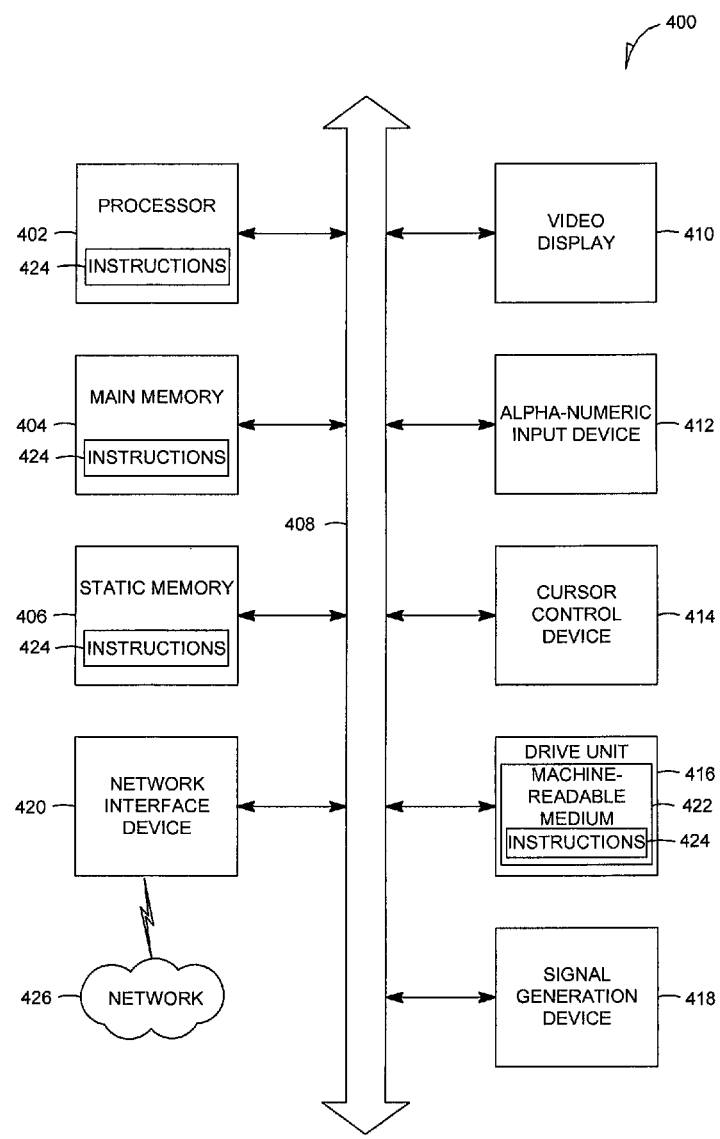
FIG. 4 shows a diagrammatic representation of machine in the example form of a computer system within which, according to various embodiments, a set of instructions, for causing the machine to perform any one or more of the methodologies discussed herein, may be executed.

FIG. 4 shows a diagrammatic representation of machine in the example form of a computer system 400 within which, according to various embodiments, a set of instructions, for causing the machine to perform any one or more of the methodologies discussed herein, may be executed. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a server computer, a client computer, a personal computer (PC), a tablet PC, a set-top box (STB), a Personal Digital Assistant (PDA), a mobile device, a cellular telephone, a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 400 includes a processor 402 (e.g., a central processing unit (CPU) a graphics processing unit (GPU) or both), a main memory 404 and a static memory 406, which communicate with each other via a bus 408. The computer system 400 may further include a video display unit 410 (e.g., a liquid crystal display (LCD) or a cathode ray tube (CRT)). The computer system 400 also includes an alphanumeric input device 412 (e.g., a keyboard), a cursor control device 414 (e.g., a mouse), a disk drive unit 416, a signal generation device 418 (e.g., a speaker) and a network interface device 420.

The disk drive unit 416 includes a machine-readable medium 422 on which is stored one or more sets of instructions (e.g., software 424) embodying any one or more of the methodologies or functions described herein. The software 424 may also reside, completely or at least partially, within the main memory 404 and/or within the processor 402 during execution thereof by the computer system 400, the main memory 404 and the processor 402 also constituting machine-readable media.

The software 424 may further be transmitted or received over a network 426 via the network interface device 420. While the machine-readable medium 422 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present invention. The term "machine-readable medium" shall accordingly be taken to include, but not be limited to, solid-state memories, optical media, and magnetic media.

Certain embodiments are described herein as including logic or a number of components, modules, or mechanisms. A module is a non-transitory and tangible unit capable of performing certain operations and may be configured or arranged in a certain manner. In example embodiments, one or more computer systems (e.g., a standalone, client or server computer system) or one or more components of a computer system (e.g., a processor or a group of processors) may be configured by software (e.g., an application or application portion) as a module that operates to perform certain operations as described herein.

In various embodiments, a module may be implemented mechanically or electronically. For example, a module may comprise dedicated circuitry or logic that is permanently configured (e.g., as a special-purpose processor) to perform certain operations. A module also may comprise programmable logic or circuitry (e.g., as encompassed within a general-purpose processor or other programmable processor) that is temporarily configured by software to perform certain operations. It will be appreciated that the decision to implement a module mechanically, in dedicated and permanently configured circuitry, or in temporarily configured circuitry (e.g., configured by software) may be driven by cost and time considerations.

Accordingly, the term "module" should be understood to encompass a tangible entity, be that an entity that is physically constructed, permanently configured (e.g., hardwired) or temporarily configured (e.g., programmed) to operate in a certain manner and/or to perform certain operations described herein. Considering embodiments in which modules are temporarily configured (e.g., programmed), each of the modules need not be configured or instantiated at any one instance in time. For example, where the modules comprise a general-purpose processor configured using software, the general-purpose processor may be configured as respective different modules at different times. Software may accordingly configure a processor, for example, to constitute a particular module at one instance of time and to constitute a different module at a different instance of time.

Modules can provide information to, and receive information from, other modules. Accordingly, the described modules may be regarded as being communicatively coupled. Where multiple of such modules exist contemporaneously, communications may be achieved through signal transmission (e.g., over appropriate circuits and buses) that connect the modules. In embodiments in which multiple modules are configured or instantiated at different times, communications between such modules may be achieved, for example, through the storage and retrieval of information in memory structures to which the multiple modules have access. For example, one module may perform an operation, and store the output of that operation in a memory device to which it is communicatively coupled. A further module may then, at a later time, access the memory device to retrieve and process the stored output. Modules may also initiate communications with input or output devices, and can operate on a resource (e.g., a collection of information).

Thus, a method and system for weighted request rate limiting for electronic resources have been described. Although the present invention has been described with reference to specific example embodiments, it will be evident that various modifications and changes may be made to these embodiments without departing from the broader spirit and scope of the invention. Accordingly, the specification and drawings are to be regarded in an illustrative rather than a restrictive sense. Embodiments of the systems and methods disclosed herein may be used to protect infrastructure from intentional and un-intentional heavy usage of resources. For example, embodiments of the systems and methods disclosed herein may detect and block in-ordinate use of resources exposed via commands or services.

In one embodiment, an issue detected by this system may include a consumer making hundreds of thousands of search queries with "dvd" as a keyword. This may cause an immense load on a Search Processing Back End. While making "hundreds of thousands" of search queries is fine by itself, the fact that all of them are querying the heavy keyword "dvd" can cause the Search Processing Back End to break down.

It should be noted that at particular points, the description may provide features or actions that are indicated as mandatory, e.g., described using terms such as "must" or "required" or "necessary" etc. Such features apply to particular embodiments, and features that are mandatory in some embodiments may not be mandatory in other embodiments.

What is claimed is:

1. A method comprising:
   receiving a search request associated with a consumer identifier and a search term;
   determining a predicted weight of the search request based at least on the search term;
   updating a usage history corresponding to the consumer identifier, based on the predicted weight of the search request and an actual weight of the search request;
   calculating, using a processor, a usage level associated with the consumer identifier, the usage level based on a pattern identified in the usage history associated with the consumer identifier; and
   responding to the search request based on the usage level and the predicted weight of the search request in accordance with a usage policy.

2. The method of claim 1, wherein the predicted weight of the search request is determined based on at least one of a type of the search request and parameters associated with the search request.

3. The method of claim 1, wherein the usage policy is based on a change in response time associated with the consumer identifier over a time period.

4. The method of claim 1, wherein responding to the search request comprises rejecting the request.

5. The method of claim 1, further comprising updating the usage level associated with the consumer identifier based on an actual weight of the search request.

6. The method of claim 1, wherein the request comprises the consumer identifier and a resource identifier.

7. A system comprising one or more modules implemented by one or more processors and configured to:
   receive a search request associated with a consumer identifier and a search term;
   determine a predicted weight of the search request based at least in part on the search term;
   update a usage history corresponding to the consumer identifier, based on the predicted weight of the search request and an actual weight of the search request;

calculate a usage level associated with the consumer identifier, the usage level based on a pattern identified in the usage history associated with the consumer identifier; and respond to the request based on the usage level and the predicted weight of the search request in accordance with a usage policy.

8. The system of claim 7, wherein the usage policy is based on a change in response time associated with the consumer identifier over a time period.

9. The system of claim 7, wherein the enforcer module is further configured to reject the search request.

10. The system of claim 7, wherein the usage module is further configured to update the usage level associated with the consumer identifier based on an actual weight of the search request.

11. The system of claim 7, wherein the search request comprises the consumer identifier and a resource identifier.

12. A non-transitory machine-readable medium comprising stored instructions, wherein the instructions, when executed, cause a machine to perform operations, comprising:

receiving a search request associated with a consumer identifier and a search term;

determining a predicted weight of the search request based at least in part on the search term;

updating a usage history corresponding to the consumer identifier, based on the predicted weight of the search request and an actual weight of the search request;

calculating a usage level associated with the consumer identifier, the usage level based on a pattern identified in the usage history associated with the consumer identifier; and responding to the search request based on the usage level and the predicted weight in accordance with a usage policy.

13. The non-transitory machine-readable medium of claim 12, wherein the predicted weight of the search request is based on responding to a plurality of previous search requests.

14. The non-transitory machine-readable medium of claim 12, the machine-readable medium further comprising stored instructions, wherein the instructions, when executed, cause a machine to update the usage history associated with the consumer identifier based on the search request.

15. A system, comprising:

means for receiving a search request associated with a consumer identifier and a search term;

means for determining a predicted weight of the search request, based at least in part on the search term;

means for updating a usage history corresponding to the consumer identifier, based on the predicted weight of the search request and an actual weight of the search request;

means for calculating, using a processor, a usage level associated with the consumer identifier, the usage level based on a pattern identified in the usage history associated with the consumer identifier; and means for responding to the search request based on the predicted weight of the search request and the first usage level in accordance with a usage policy.

16. The system of claim 15, further comprising:

means for updating the usage history associated with the consumer identifier based on the search request.

17. The method of claim 1, wherein the updating of the usage history corresponding to the consumer identifier is further based on a response time, a request type, and a request parameter.

18. The system of claim 7, wherein the updating of the usage history corresponding to the consumer identifier is further based on a response time, a request type, and a request parameter.

19. The non-transitory machine-readable medium of claim 12, wherein the updating of the usage history corresponding to the consumer identifier is further based on a response time, a request type, and a request parameter.

20. The system of claim 15, wherein the means for updating the usage history corresponding to the consumer identifier updates the usage history corresponding to the consumer identifier based on a response time, a request type, and a request parameter.

* * * * *